United States Patent [19]

Sato et al.

[11] 4,366,704

[45] Jan. 4, 1983

[54] AIR INTAKE APPARATUS FOR INTERNAL COMBUSTION ENGINE

[75] Inventors: Kanemasa Sato; Sadayasu Ueno; Kazuhiko Miya, all of Katsuta, Japan

[73] Assignee: Hitachi, Ltd., Tokyo, Japan

[21] Appl. No.: 210,829

[22] Filed: Nov. 26, 1980

[30] Foreign Application Priority Data

Nov. 27, 1979 [JP] Japan ............................. 54-153947

[51] Int. Cl.³ ......................................... G01M 15/00
[52] U.S. Cl. ......................................... 73/118; 73/204
[58] Field of Search ......................... 73/118, 116, 204

[56] References Cited

U.S. PATENT DOCUMENTS 3,824,966 7/1974 Schneider et al.
3,992,940 11/1976 Platzer, Jr. ............................. 73/204
4,142,170 2/1979 Blatter ............................. 73/204 X
4,264,961 4/1981 Nishimura et al. ............... 73/204 X

FOREIGN PATENT DOCUMENTS 52-113432 9/1977 Japan .

*Primary Examiner*—Jerry W. Myracle
*Attorney, Agent, or Firm*—Antonelli, Terry & Wands

[57] ABSTRACT

An air intake apparatus for the internal combustion engine is disclosed comprising a heating resistor placed in a bypass for passing the air of an amount in a predetermined ratio to the amount of the air passing through a main air path communicating with the internal combustion engine, the bypass circumventing or detouring the main air path. The bypass body for defining the bypass is made of a synthetic resin material in order to prevent heat conduction to the heating resistor from an external source.

12 Claims, 5 Drawing Figures

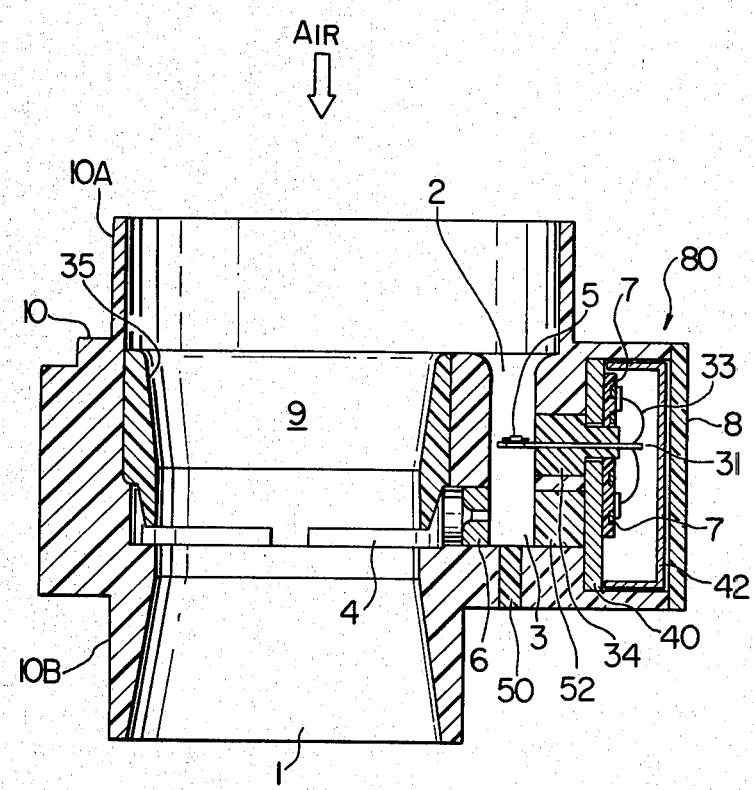

AIR INTAKE APPARATUS FOR INTERNAL COMBUSTION ENGINE

BACKGROUND OF THE INVENTION

1. FIELD OF THE INVENTION

The present invention relates to an apparatus for measuring the amount of air taken into the internal combustion engine of an automobile or the like, or more in particular to an air intake apparatus for the apparatus for measuring the amount of air taken into the internal combustion engine, comprising a heating resistor of a constant-temperature type disposed in a bypass of the venturi.

2. DESCRIPTION OF THE PRIOR ART

Some conventional air intake apparatuses have a heating resistor disposed directly in the main air path as disclosed by U.S. Pat. Nos. 3,824,966 and 3,992,940. The heating resistor of these apparatuses is degenerated in quality or deformed by a high-temperature flame or a high-pressure blast caused by a back fire, so that the resistance value thereof is reduced, thus adversely affecting the flow rate measuring accuracy. In extreme cases, the heating resistor is broken.

In order to overcome this disadvantage, other conventional air intake apparatuses comprise a bypass of the venturi, in which a heating resistor is disposed, as disclosed in Japanese Patent Laid-Open No. 113432/77. In this type of air intake apparatus, the heating resistor, which is not exposed directly to the flame or blast of a back fire, is not deformed or degenerated in quality which otherwise might change the characteristics thereof. In spite of this advantage, it has the problem points as mentioned below.

(1) The ends of the heating resistor are connected to supporting conductors which are connected to a drive circuit for the heating resistor by lead wire. The variation of the lead wires leads to the variation of the wiring resistance. Also, the variation in the amount of solder used on the lead wire causes the variation in the measurement accuracy of the air flow rate.

(2) The air introduction port of the conventional main air path and bypass are in many cases formed of aluminum or the like by die casting and therefore is easily affected by the thermal change of the internal combustion engine. Specifically, during the driving of an automobile, the temperature of the part of the automobile provided with the heating resistor gradually rises, thus changing the temperature of the heating resistor making up a temperature sensor through the lead wire or the supporting conductors. This reduces the measuring accuracy.

(3) The heating resistor is often used in juxtaposition with a resistor for air temperature compensation. The conventional heating resistors are comparatively large in size and therefore the two resistors are arranged longitudinally of the air flow in the bypass, namely, along the direction of the air flow in the bypass. As a result, the air heated by the heating resistor disposed upstream comes into contact with the compensating resistor disposed downstream, thereby leading to a reduced measurement accuracy. In order to overcome this problem, other conventional air intake apparatuses have the two resistors staggered, in which case the lengths of the two supporting wires are different, with the result that the thermal effect of the air introduction port is different, thereby reducing the measuring accuracy.

Means for preventing the thermal effect on the resistors is disclosed in the above-quoted U.S. Pat. No. 3,824,966. The resistor of this patent, however, does not take the back fire into consideration as it is disposed in the main air path.

SUMMARY OF THE INVENTION

The object of the present invention is to provide an air intake apparatus for the internal combustion engine high in productivity which is capable of assuring a high accuracy of air flow rate measurement.

According to the present invention, there is provided an air intake apparatus for the internal combustion engine, comprising resistors in a bypass circumventing the main air path communicating with the internal combustion engine, in which the bypass body defining the bypass is made of a synthetic resin in order to avoid heat conduction from an external source to the resistors.

BRIEF DESCRIPTION OF THE DRAWINGS

FIG. 5 is a sectional view showing another embodiment of the air intake apparatus shown in FIG. 1.

DESCRIPTION OF THE PREFERRED EMBODIMENTS

Figure 1:
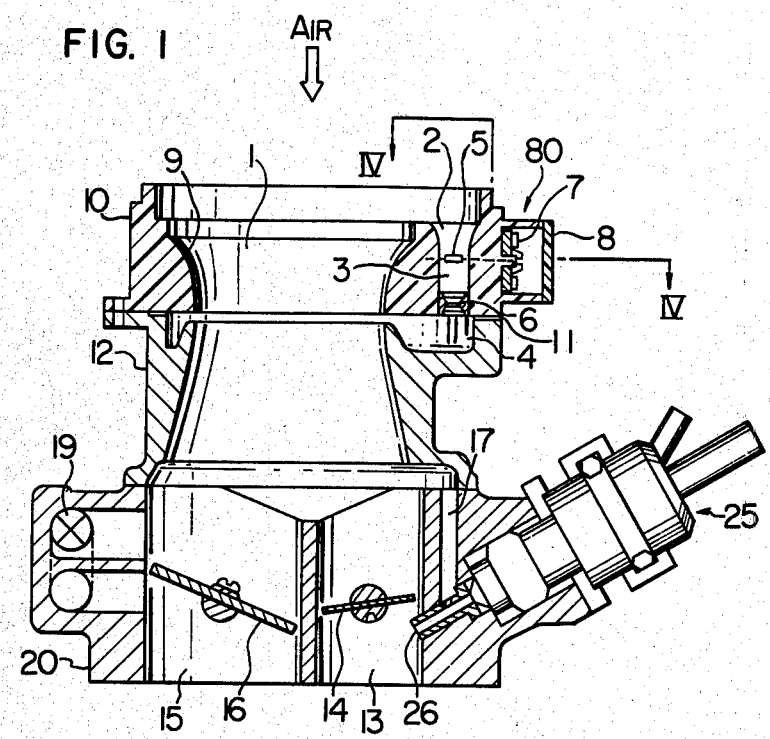
FIG. 1 is a sectional view of a mixed gas supply with an air intake apparatus according to an embodiment of the present invention.

A sectional view of a mixed gas supply device having an air intake apparatus according to an embodiment of the present invention is shown in FIG. 1. The air taken from the main air path of a frame 10 forming a venturi 9 flows into a valve body through an air introduction cyclinder 12. This valve body 20 has a pair of bores 13 and 15. The nozzle 26 of a fuel injection valve 25 has an opening downstream of a throttle valve 14 of the primary air intake path 13. Adjacent to this primary air intake path, there is provided a secondary air intake path 15 which has a secondary throttle valve 16 therein. An idle control valve 19 is disposed on the left side of this secondary throttle valve 16. The air from the air path 17 formed in the valve body 20 flows into a small hole formed in the side wall of the 26 of the fuel injection valve 25.

Figure 2:
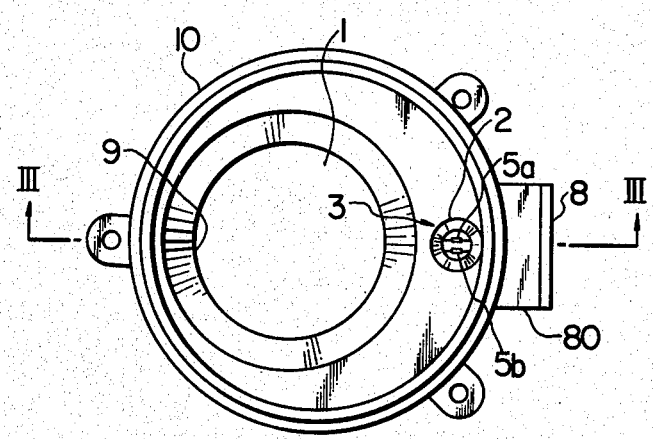
FIG. 2 is a plan view of the frame of the apparatus shown in FIG. 1.
Figure 3:
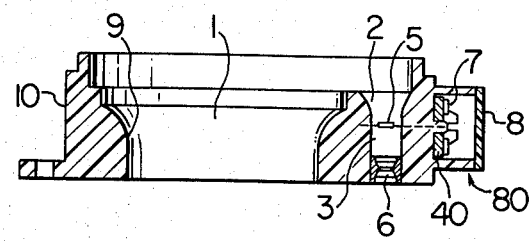
FIG. 3 is a sectional view taken along the line III—III in FIG. 2.

A plan view of the frame of FIG. 1 is shown in FIG. 2, and a sectional view taken along the line III—III in FIG. 2 is shown in FIG. 3. The venturi 9 is formed in the main air path 1 of the frame 10, and a bypass 3 communicating with the inlet 2 is formed to the right of the venturi 9. This bypass 3 contains two resistors 5a and 5b and a flow rate adjusting orifice 6 of metallic material downstream of the resistors. The resistor 5a is a heating resistor used for measurements, and the resistor 5b is one for air temperature compensation, both being connected to the drive circuit 7 by a supporting conductor 31. The drive circuit disclosed in, say, U.S. patent Ser. No. 78468 filed Sept. 24, 1979 now Pat. No. 4,297,881. A housing 80 of the drive circuit 7 makes up part of the frame 10 and is hermetically sealed by a cover 8 of insulating material. A conductor for connecting the drive circuit 7 to an external power supply is taken out of the housing 80.

The frame 10 is made of a heat-resistant synthetic resin easy to mold and high in electrical insulation, and therefore the supporting conductor 31 is capable of being easily embedded therein by molding.

Figure 4:
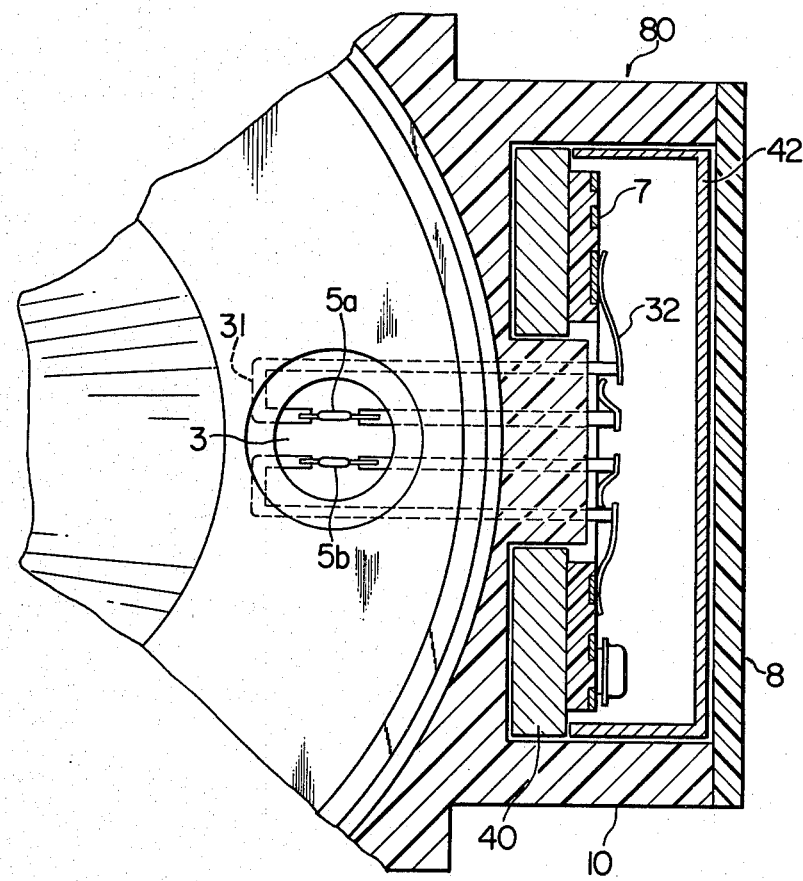
FIG. 4 is a partly enlarged diagram showing in detail the connection between the resistors and a drive circuit.

FIG. 4 is a detailed diagram for explaining the connection between the resistors and the drive circuit 7. The resistors 5a and 5b are aligned in juxtaposition at the same height in a plane substantially perpendicular to the air flow with the ends thereof being connected to a pair of supporting conductors 31 embedded in the frame 10. The ends of each of the supporting conductors 31 are protruded into the housing 80 of the drive circuit 7 arranged on a printed board and is connected through a contactor 32 to the terminal of the drive circuit 7. The drive circuit 7 is preferably disposed on a heat-absorbing aluminum substrate 40. It is also preferable to provide a shield box 42 within the housing 80 for shutting out any harmful electric waves from an external source. The ends of the resistors are spot-welded to the supporting conductors.

The resistors 5a and 5b preferably have exactly the same construction and comprise a platinum wire 20 μm in diameter wound on a bobbin. The resistors 5a and 5b are so compact that the outer diameter thereof including the platinum wire is 0.55 mm and the length thereof is as small as 2 mm. Therefore, they can be disposed in juxtaposition within the bypass 3 having an inner diameter of 8 mm on the one hand and are high in responsiveness on the other hand. As a result, unlike in the conventional constructions in which the resistors are arranged at different positions longitudinarlly of the air flow, thermal interference does not occur. Further, in view of the fact that those portions of the supporting conductors 31 which are exposed to the bypass 3 are short and symmetric with each other, the resistors 5a and 5b are cooled by the air flow under exactly the same conduction. Furthermore, the frame 10 is made of a synthetic resin low in thermal conductivity so that the temperature increase of the frame 10 is small and the thermal effect thereof on the heating resistors 5a and 5b can be neglected.

As shown in FIG. 1, the frame 10 and the air introduction cylinder 12 are screwed to each other through a packing 11 of such a material as asbestos low in thermal conductivity, and therefore little heat is transmitted to the frame 10 from the internal combustion engine, thus keeping the frame 10 at a lower temperature than the conventional frame of aluminum. In other words, this intake air amount measuring apparatus is well balanced and high in accuracy. The bypass 3 ends at the outlet 4 forming an annular gap between the frame 10 and the air introduction cylinder 12, thus leading to an advantage mentioned later. A metallic orifice 6 for adjusting the ratio of air flow between the bypass and the main air path is replaceably provided in the bypass 3 for the purpose of determining the air flow ratio of the bypass 3 with respect to the main air path 1 accurately by compensating for the difficulty of molding the bypass 3 to an accurate small diameter.

The operation of the air intake apparatus and the function of intake air amount measurement will be explained below with reference to FIG. 1. When the internal combustion engine (not shown) is started, a negative pressure is generated downstream of the throttle valves 14 and 16 in the intake paths 13 and 15. Upon further depression of the pedal by the operator thereby to open the primary throttle valve 14 to idle state, the air that has passed through the main air path 1 is taken into the internal bombustion engine through the primary air intake path 13. Under this condition, the intake negative pressure generated downstream of the primary throttle valve 14 causes the air to flow through the air path 17, so that the liquid fuel supplied from the fuel injection valve 25 is further atomized and injected by way of the nozzle 26.

In this idle state for starting warm-up or when the load such as a car cooler is working, the idle control valve 19 is opened so that the air is supplied bypassing the secondary throttle valve 16 to meet the increased load. When a high load running condition is reached with the increase in the opening of the primary throttle valve 14, the secondary throttle valve is opened in interlocked relation with the parimary throttle valve thereby to guide a great amount of intake the internal combustion engine. At this time, the amount of fuel supplied from the fuel injection valve 25 also increases in proportion to the amount of air intake, thus supplying a mixture gas suited to the operating conditions to the internal combustion engine.

The outlet 4 formed in the annular gap under the frame 10 is opened to the narrowest part of the venturi 9, and therefore when the intake air passes through the venturi 9, a negative pressure is generated at the outlet 4. This negative pressure is proportional to the flow velocity of the intake air, so that the air proportional to the amount of the main air flows dividedly in the bypass 3, the ratio of division of which is controlled by the flow-rate adjusting orifice 6. For changing the ratio of division, the flow-rate adjusting orifice 6 may be replaced by another orifice with a desired diameter.

The air intake apparatus according to this embodiment constructed as described above has the advantages as mentioned below.

(1) The frame 10 which is made of synthetic resin mold can be mass-produced at low cost. Also, the low thermal conductivity of the frame 10 reduces the thermal effect of the internal combustion engine on the resistors 5.

(2) In view of the fact that the resistors 5a and 5b are small and juxtaposed in the bypass 3, the thermal interference which otherwise might occur therebetween is eliminated. Further, the supporting conductors 31 supporting the resistors 5 are exposed in the bypass 3 in a smaller proportion than in the conventional apparatuses, and are embedded in the frame 10 symmetrically, resulting in a superior thermal balance thereof. Furthermore, the fewer number of connections saves the connecting steps on the one hand and excludes the difference in contact resistance on the other hand. In other words, an electrical stability and improved productivity are attained.

(3) The outlet of the bypass 3 is annular in form and therefore even if there is a partial difference in the flow velocity of the main air passing through the venturi 9 (which is often caused when the primary throttle valve 14 alone is open), a uniform negative pressure is applied through the bypass 3, thus improving the measuring accuracy. Also, in case of a back fire, the static pressure construction of the apparatus prevents the reversal flow of the flame or blast through the bypass 3, thereby preventing the resistors from being damaged or contaminated.

(4) The housing 80 of the drive circuit 7 of the resistors 5 is integrally formed with the frame 10 and therefore it is not necessary to provide a separate part for this purpose, thus improving the productivity.

A sectional view of the air intake apparatus according to a modification of FIG. 1 is shown in FIG. 5. In this drawing, those component parts similar to those in FIG. 1 are denoted by similar reference numerals to those in FIG. 1. According to this modification, a venturi cylinder 35 of synthetic resin separate from the synthetic resin frame 10 is inserted to form the upper half part of the synthetic resin venturi 9. An outlet 4 with an annular gap is formed between the lower end of the venturi cylinder 35 and the lower part of the venturi 9 provided at the lower part of the frame 10. A pair of the supporting conductors 31 mounted with a pair of the resistors 5 are embedded in a bushing 34 of an insulating material and inserted into the hole of the frame 10. The ends of the supporting conductors 31 are connected to the drive circuit 7 by means of the lead wires 33.

The hole formed by extraction of the die in molding the frame 10 is filled with fillers 50 and 52 of similar synthetic resin material. The venturi cylinder 35 separately molded is press fitted into the frame 10 and preferably bonded thereto. The upper and lower parts of the frame 10 comprise cylindrical parts 10A and 10B which may be connected with a proper duct. By using the desired length of the duct for the frame 10 according to the embodiment of FIG. 5, therefore, the frame 10 may be disposed in an environment most favorable in thermal respect sufficiently far from the engine or the carburetor.

This construction results in the advantage that the resistors 5, after being mounted on the supporting conductors 31, are incorporated in the apparatus, thus facilitating the assembly of the resistors 5. The frame 10 contains all the intake air amount measuring devices and therefore the assembly can determine the apparatus characteristics by itself, thus further improving the productivity.

We claim:

1. An air intake apparatus for an internal combustion engine comprising a bypass body having a bypass passage formed therein for passing air of an amount in a predetermined ratio with respect to air passing through a main air path communicating with the internal combustion engine, said bypass passage detouring said main air path, a heating resistor disposed in said bypass passage, and means for measuring the amount of air taken into said internal combustion engine by use of the radiation of heat from said heating resistor into the air, wherein at least the bypass body defining said bypass passage is made of a synthetic resin material of a low heat conductivity.

2. An air intake apparatus according to claim 1, wherein said main air path is formed of a body made up of a synthetic resin material of a low heat conductivity.

3. An air intake apparatus according to claim 2, wherein said bypass body is integrally formed with the body in which the main air path is formed.

4. An air intake apparatus according to claim 1, wherein said bypass passage is provided with a metallic orifice for maintaining a predetermined ratio of the amount of the air passing through said main air path to the amount of the air passing through said bypass passage, said bypass passage having an outlet in annular slit form formed at the narrowest part of the venturi of said main air path.

5. An air intake apparatus according to claim 1, wherein a pair of supporting conductors are embedded in the sides of said bypass passage in opposite and symmetric relation to each other with respect to the central axis of said bypass passage, and the ends of said heating resistor are fixedly connected to said supporting conductors respectively.

6. An air intake apparatus according to claim 1, wherein said bypass body includes an externally-directed hole therethrough along the direction perpendicular to the axis of said bypass passage, and a pair of supporting conductors are embedded in a block of synthetic resin to be filled in said hole, said heating resistor having the ends thereof securely connected to said supporting conductors respectively.

7. An air intake apparatus according to claim 1, further comprising a housing of a synthetic resin material for containing an electronic circuit for driving said heating resistor, said housing being molded integrally with said bypass body.

8. An air intake apparatus according to claim 1, further comprising an air temperature compensating resistor said air temperature compensating resistor and said heating resistor being juxtaposed substantially symmetrically with respect to the axis of said bypass passage in a plane substantially perpendicular to said axis of said bypass passage.

9. An air intake apparatus according to claim 8, wherein said air temperature compensating resistor has the same construction as said heating resistor.

10. An air intake apparatus for the internal combustion engine, comprising a bypass of a synthetic resin material for passing the air in an amount of a predetermined ratio with respect to the amount of air passing through a main air path communicating with the internal combustion engine, said bypass detouring said main air path, a heating resistor provided in said bypass, an externally-directed hole formed in the bypass body defining said bypass along the direction substantially perpendicular to the axis of said bypass, a block of a synthetic resin material to be filled in said hole, a pair of supporting conductors embedded in said filling block, and means for securely connecting the ends of said heating resistor to said supporting conductors respectively.

11. An air intake apparatus according to claim 10, further comprising a housing of a synthetic resin material for containing an electronic circuit for driving said heating resistor, said housing being molded integrally with said body on part of the outer periphery of said bypass body.

12. An air intake apparatus according to claim 10, further comprising an air temperature compensating resistor, said air temperature compensating resistor and said heating resistor being juxtaposed substantially symmetrically with respect to the axis of said bypass in a plane substantially perpendicular to said axis.

* * * * *